United States Patent
Baxter et al.

(10) Patent No.: US 7,311,332 B2
(45) Date of Patent: Dec. 25, 2007

(54) SPEED CRANK LOCKING DEVICE FOR TRAILER LANDING GEAR ASSEMBLY

(75) Inventors: David A. Baxter, Warrenton, MO (US); Bobby G. Baxter, Warrenton, MO (US)

(73) Assignee: Baxter Properties, L.L.C., Warrenton, MO (US)

( * ) Notice: Subject to any disclaimer, the term of this patent is extended or adjusted under 35 U.S.C. 154(b) by 0 days.

(21) Appl. No.: 11/076,674

(22) Filed: Mar. 10, 2005

(65) Prior Publication Data

US 2006/0202460 A1    Sep. 14, 2006

(51) Int. Cl.
*B60S 9/02*    (2006.01)
(52) U.S. Cl. .............. 280/766.1; 280/763.1; 254/419
(58) Field of Classification Search ........... 280/763.1, 280/766.1, 765, 475, 477; 248/352, 650; 254/419, 418, 423, 420, 98, 425, 424; 74/548, 74/547
See application file for complete search history.

(56) References Cited

U.S. PATENT DOCUMENTS

| | | | |
|---|---|---|---|
| 861,373 A * | 7/1907 | Lewis ....................... 254/103 |
| 1,269,359 A * | 6/1918 | Young ......................... 74/547 |
| 1,377,026 A * | 5/1921 | Penrose ....................... 254/98 |
| 1,890,972 A * | 12/1932 | Davis ......................... 254/419 |
| 1,941,214 A * | 12/1933 | Frank .......................... 74/547 |
| 2,771,787 A * | 11/1956 | Dixon ......................... 254/98 |
| 3,081,065 A | 3/1963 | Dalton |
| 3,174,358 A * | 3/1965 | Wachta ........................ 74/548 |
| 3,436,987 A | 4/1969 | Baxter |
| 3,632,086 A * | 1/1972 | Mai .......................... 254/419 |
| 3,738,613 A * | 6/1973 | Hollis, Jr. .................. 254/420 |
| 4,437,621 A * | 3/1984 | Sakumoto ..................... 74/547 |
| 4,524,921 A * | 6/1985 | Ozaki et al. .................. 74/547 |
| 4,796,864 A * | 1/1989 | Wilson ....................... 254/425 |
| 5,423,518 A * | 6/1995 | Baxter et al. ............... 254/419 |
| 5,904,342 A | 5/1999 | Laarman |

* cited by examiner

*Primary Examiner*—Hau Phan
(74) *Attorney, Agent, or Firm*—Thompson Coburn LLP

(57) ABSTRACT

A speed crank locking device automatically secures a hand crank in its operative position to an input shaft of a gearing mechanism, with the locking device being easily disengaged to move the crank from its operative position to a stored position following rotation of the crank in the operation of the mechanism, the locked device also holding the crank in the stored position.

18 Claims, 4 Drawing Sheets

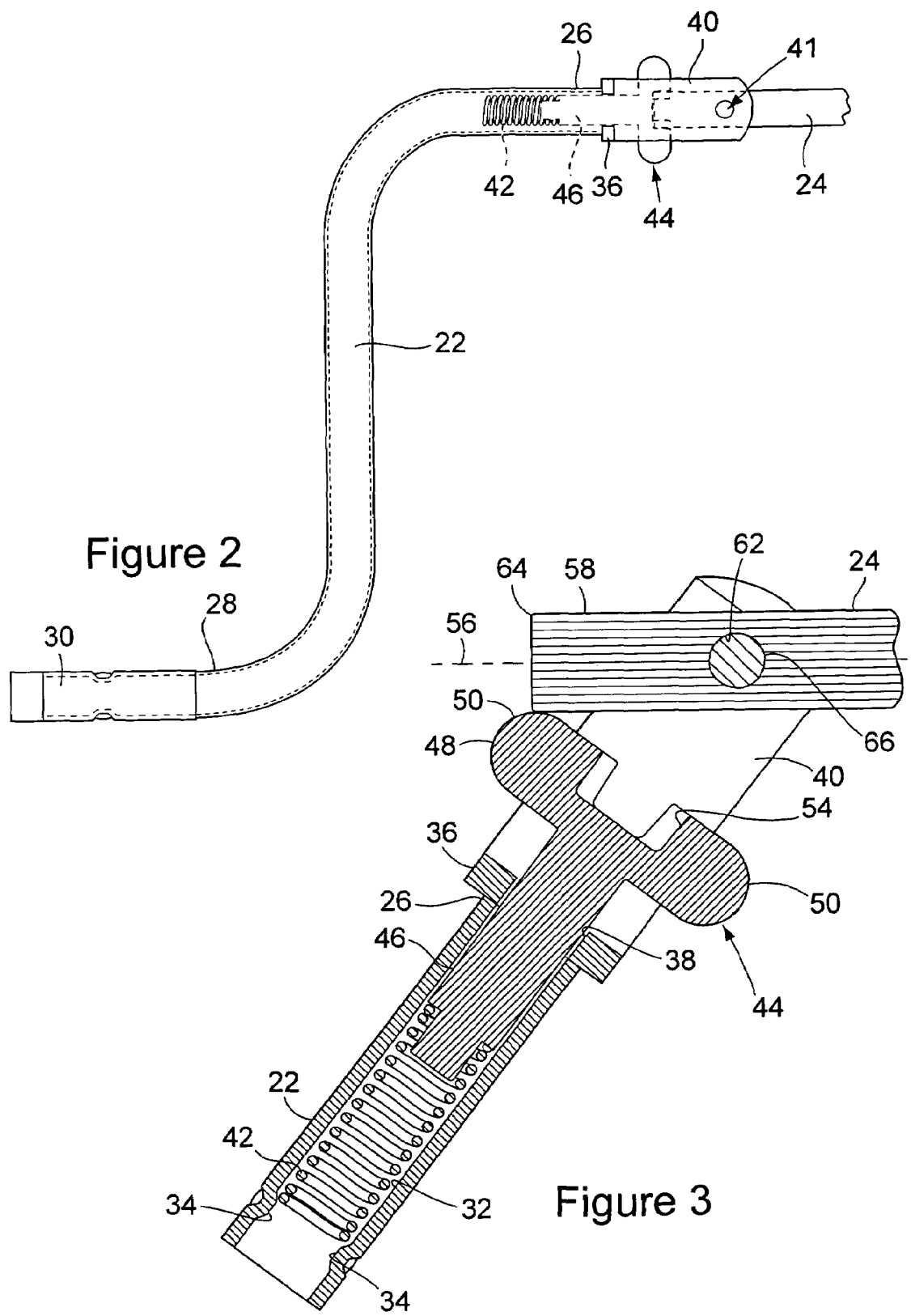

SPEED CRANK LOCKING DEVICE FOR TRAILER LANDING GEAR ASSEMBLY

BACKGROUND OF THE INVENTION (1) Field of the Invention

The present invention pertains to a crank that is manually rotated to selectively lower and raise a landing gear assembly of a truck trailer. More specifically, the present invention pertains to a locking device that automatically secures the hand crank in its operative position relative to the landing gear assembly, where the locking device is easily disengaged to move the crank from its operative position to its stored position following the operation of the landing gear assembly.

(2) Description of the Related Art

Many of the different types of trailers that are towed by trucks are connected to the trucks by a releasable coupling such as a gooseneck coupling or a fifth wheel coupling. When the trailer is released from the truck and is no longer supported by the truck at the forward end of the trailer, a landing gear assembly is often used to support the trailer floor or bed in a generally horizontal position.

The typical landing gear assembly is attached to the underside of the trailer adjacent the truck coupling at the forward end of the trailer. The assembly includes a pair of vertically oriented columns positioned adjacent opposite sides of the trailer bed. A vertical leg is mounted on each column. A gear mechanism on each column is selectively operated to lower the legs from the columns, or raise the legs on the columns. The gear mechanisms of the two columns are connected by a shaft assembly that extends across the underside of the trailer between the two columns. A hand crank is connected to the shaft assembly at one side of the trailer. Selectively rotating the hand crank in opposite directions lowers the pair of legs until the legs contact the ground and support the trailer forward end when the trailer is being uncoupled from the truck, or raise the pair of legs when the trailer has been connected to a truck and is ready for towing.

The typical hand crank is connected to the shaft of the landing gear assembly by a pivot connection. The pivot connection enables the hand crank to be pivoted outwardly from a side of the trailer to an operative position of the crank where there is ample clearance to rotate the crank in selectively lowering and raising the legs of the landing gear assembly. When the trailer is being towed, the pivot connection enables the hand crank to be pivoted beneath the landing gear assembly shaft to a stored position where the crank is not projecting outwardly from the side of the trailer.

Many prior art landing gear assemblies have two speed designs that enable the legs of the landing gear assembly to be lowered and raised at different speeds. The input shaft of the landing gear assembly is moved axially inwardly and outwardly relative to the trailer to shift the assembly between the two speeds. For example, the landing gear assembly shaft can be pushed inwardly by the truck operator to shift to a high speed gear. Rotation of the input shaft by the hand crank will then cause the legs of the assembly to be lowered or raised at a faster rate. This enables the legs of the landing gear assembly to be lowered quickly until they come into engagement with the ground when it is desired to uncouple the trailer from the truck. The gear mechanism of the landing gear assembly is then shifted to a low gear ratio by pulling on the crank, moving the input shaft axially outwardly away from the trailer assembly. When shifted to the low gear ratio, more power is transferred to the legs by the reduced gearing of the gear mechanism. For each rotation of the crank the legs are lowered at a slower rate, but more power is transferred to the legs enabling the landing gear assembly to lift the trailer from the truck when uncoupling the trailer from the truck.

The hand crank of current landing gear assemblies typically has a socket at one end. The crank socket end is positioned axially over the end of the landing gear input shaft when positioning the crank in its operative position to turn the input shaft. A yoke is also formed on the socket end of the crank. The yoke has a pair of arms that project axially outwardly from the socket on opposite sides of the input shaft. Each yoke arm has a slot. A pin extends transversely through the end of the landing gear assembly input shaft and opposite ends of the pin are received in the slots of the crank yoke, thereby attaching the yoke to the gear assembly shaft end.

The pin provides a pivot connection between the landing gear assembly input shaft and the crank that enables the crank to be pivoted upwardly to position the crank socket in alignment with the landing gear assembly input shaft end. The slots in the crank yoke enable the crank to be moved axially toward the trailer to its operative position, inserting the end of the landing gear assembly input shaft into the crank socket while the pin on the end of the input shaft moves through the yoke slots.

The crank is moved to a stored position by manually pulling the crank in an axial direction away from the trailer, removing the landing gear assembly shaft end from the crank socket and causing the shaft pin to move through the yoke slots. This enables the hand crank to be pivoted about the pin through the shaft end to a stored position of the crank beneath the shaft.

Because the gear mechanism of the landing gear assembly is shifted between high and low gear by moving the input shaft axially inwardly toward the gear assembly and axially outwardly away from the gear assembly, shifting the gear assembly often results in the crank socket being unintentionally removed from the landing gear assembly shaft end. For example, with the crank in its operative position on the landing gear assembly shaft end and the shaft pushed axially inwardly, if it is desired to shift the gear ratio the gear assembly shaft must be moved axially outwardly by the hand crank. As a result, the crank socket will disengage from the landing gear shaft when the crank is pulled outwardly to shift gears. This makes it necessary to then push the crank inwardly positioning the socket back over the shaft end, while being careful not to push the landing gear assembly out of the shifted gear while reengaging the crank socket on the shaft end. Thus, the prior art landing gear assemblies are disadvantaged in that shifting the gear assembly by pulling the shaft outwardly often results in the crank being disengaged from the gear assembly input shaft.

A further disadvantage of prior art landing gear assemblies is that the crank is not secured in place to the landing gear input shaft, but is just pushed over the end of the input shaft for the short distance of the shaft end that engages in the crank socket. Only the friction engagement between the shaft end and the interior surface of the crank socket maintains the crank on the landing gear assembly input shaft. There is no positive lock or positive engagement between the crank and the input shaft, and all cranks can come off of the input shaft while the crank is being used to manually turn the shaft, and when the crank is being used to shift the input shaft outwardly when shifting the landing gear assembly.

Prior art landing gear assemblies are also disadvantaged in that the connection of the hand crank to the landing gear assembly input shaft typically has a great deal of clearance between the crank socket and the shaft end and between the crank yoke slots and the shaft pin. This results in the crank being loosely attached to the landing gear shaft end. This loose attachment of the crank allows the crank to wobble as the truck driver is attempting to rotate the landing gear shaft with the crank, which adds to the difficulty of rotating the shaft.

SUMMARY OF THE INVENTION

The hand crank of the present invention overcomes the disadvantages associated with the prior art landing gear assembly hand cranks by providing a hand crank with a locking device that securely attaches the hand crank to the landing gear assembly input shaft in the operative position of the crank, and is quickly and easily unlocked from the input shaft enabling the hand crank to be pivoted to its stored position.

The crank of the invention is similar to prior art crank constructions. The crank is basically a hollow tube having a length formed in a general S-shape with a handle at one end and an open socket at the opposite end.

A yoke is also provided on the socket end of the crank, as in prior art cranks. The yoke has a pair of arms that project outwardly from the crank socket end. The crank of the invention differs in construction from the prior art hand crank in that, where the prior art hand crank had a pair of elongated slots in the pair of arms, the crank of the invention has a pair of axially aligned circular pinholes through the arms. A pin extends through the crank arm holes and through a hole at the end of the input shaft. The pin thereby connects the hand crank to the input shaft for pivoting movement of the hand crank about the pin. The crank arm pivots between an operative position where the crank socket is aligned with the shaft end, and a stored position of the crank beneath the shaft in much the same manner as the prior art hand crank. However, because the crank yoke arms do not have the elongated slots of the prior art hand crank, the hand crank cannot move axially relative to the end of the input shaft as does the prior art hand crank.

The hand crank of the invention also differs from the prior art hand crank in that it comprises a plunger mounted in the crank arm socket for reciprocating movement of the plunger relative to the socket. The plunger has a rod at one end that is received in the crank arm socket. A coil spring inside the crank arm socket engages against the plunger rod and biases the plunger outwardly away from the crank arm socket. The plunger has a plunger head on an opposite end of the plunger from the plunger rod. A hole is recessed into the plunger head. The hole is dimensioned to receive the end of the input shaft in the hole.

In the stored position of the hand crank beneath to the input shaft, the coil spring pushes the plunger head into engagement with the side of the input shaft. As the hand crank is moved from its stored position beneath the input shaft toward its operative position relative to the input shaft, the plunger spring continues to push the plunger head into engagement with the shaft end. The shaft end slides across the plunger head surface as the hand crank is pivoted upwardly relative to the input shaft. As the hand crank approaches its operative position with the crank arm socket aligned with the shaft end, the shaft end approaches the hole in the plunger head surface. When the shaft end is aligned with the plunger head hole, the plunger spring pushes the plunger head toward the shaft end causing the shaft end to move into the plunger hole. This positively engages the crank arm to the landing gear assembly input shaft for rotation of the shaft on rotation of the crank arm. The coil spring biasing the plunger into engagement with the shaft end prevents the shaft end from becoming inadvertently disengaged from the crank arm as the crank arm is rotated. The pivot pin connection between the shaft end and the crank arm holes maintains the connection between the shaft and crank arm as the shaft is shifted axially by pulling on the crank arm. The coil spring pushing the plunger into engagement with the shaft end also provides a secure connection between the crank arm and the shaft, eliminating the wobbling feeling of the prior art hand crank and landing gear assembly shaft connection.

To disengage the hand crank from the landing gear input shaft to move the hand crank to its stored position, the truck driver merely grasps the lock plunger head with one hand and pulls the plunger head toward the crank arm socket. This causes the plunger rod to compress the spring in the crank arm socket, and disengages the shaft end from the plunger head hole. The crank arm is then free to pivot about the pivot pin to its stored position beneath the landing gear assembly input shaft.

The preferred embodiment of the speed crank locking device positions the coil spring inside the socket of the crank arm where the spring is protected from the exterior environment. In an alternate embodiment of the device, the spring is positioned on the plunger rod outside the crank arm socket. The spring functions in the same manner, biasing the lock plunger head toward the input shaft end.

Both embodiments of the hand crank locking device of the invention require only minimal modifications to the component parts used in a conventional pivoting connection between a hand crank and a landing gear assembly input shaft. Both embodiments provide the benefits of a hand crank that is easily locked to the input shaft in its operative position, and is easily unlocked from the input shaft, without appreciably increasing the cost of manufacturing the hand crank and its connecting assembly to the input shaft.

DESCRIPTION OF THE DRAWING FIGURES

Further features of the invention are set forth in the following detailed description of the preferred embodiments of the invention, and in the following drawing figures wherein:

FIG. 2 is a side elevation view of the speed crank of the invention coupled to an input shaft of a mechanism;

FIG. 3 is an enlarged partial view, in section, of the crank and shaft locking device;

DETAILED DESCRIPTION OF THE PREFERRED EMBODIMENTS

Figure 1:
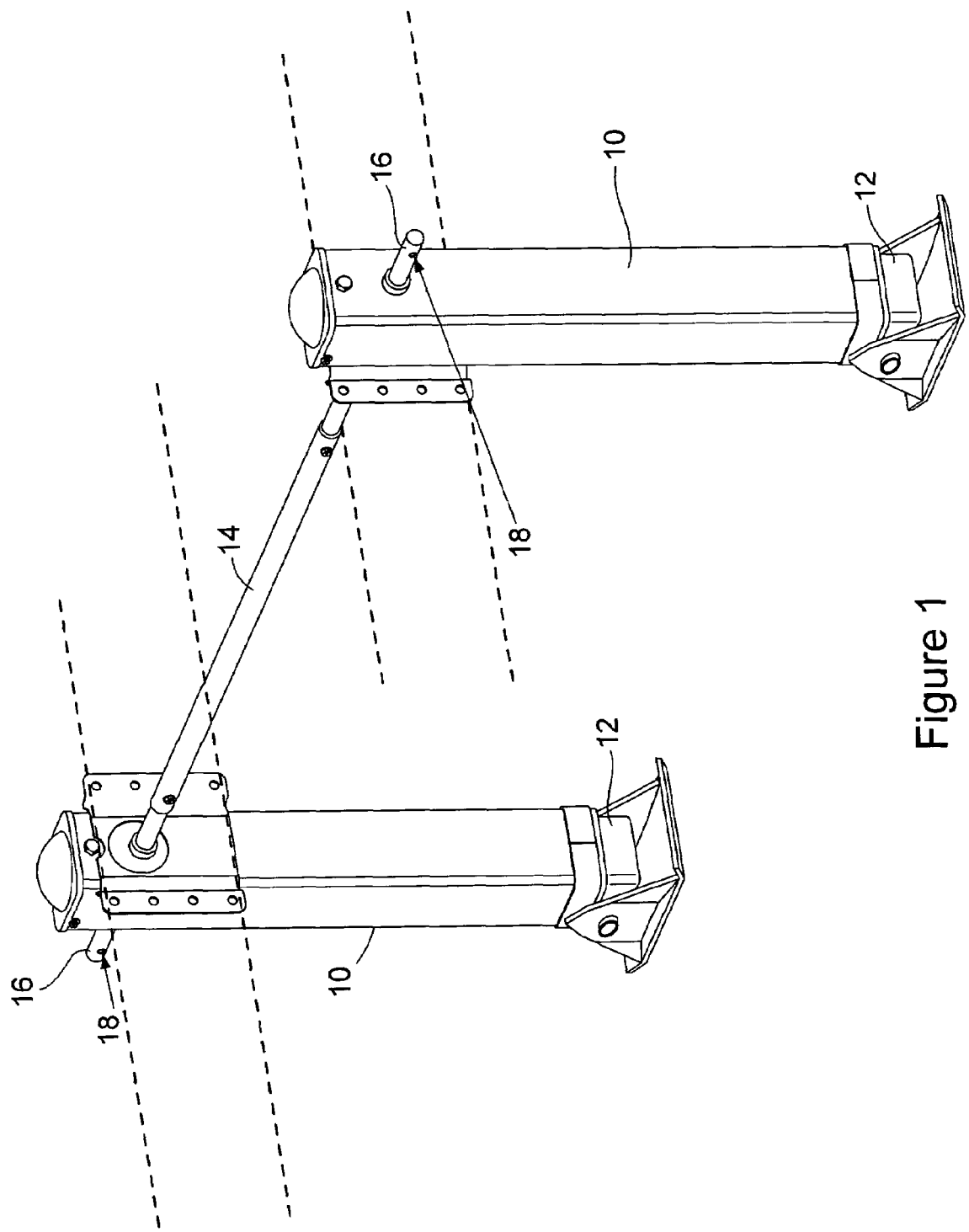
FIG. 1 is a partial perspective view of one operative environment of the invention.

FIG. 1 shows one example of a manual drive apparatus that can be improved with the speed crank locking device of the present invention. It should be understood that the environment of FIG. 1 is only one example of an environment in which the speed crank locking device of the invention may be used. It is not intended that the speed crank locking device of the invention be limited to use with mechanisms such as that shown in FIG. 1.

FIG. 1 shows an example of a trailer landing gear assembly that is attached to frame members of a truck trailer represented by the dashed lines in FIG. 1. Landing gear assemblies of the type shown in FIG. 1 are known in the art, and therefore the assembly shall only be described generally herein. As described earlier, the typical landing gear assembly includes a pair of vertically oriented columns 10 positioned at opposite sides of the truck trailer. A vertical leg 12 is mounted inside each column 10. A gear mechanism (not shown) in each column is selectively operated to raise and lower the legs 12 relative to the columns. The gear mechanisms of the two columns 10 are interconnected by a cross tube 14 that extends across the underside of the truck trailer between the two columns and connects a pair of input shafts 16. The opposite ends 16 of the input shafts project outwardly from the opposite sides of the truck trailer. Each of the shaft ends 16 has a pin hole 18 that extends through the shaft end. A selected one of the shaft pin holes 18 receives a pin (not shown) that selectively mounts a hand crank to the shaft end 16. The pin mounts the hand crank to the shaft end for pivoting movement of the hand crank upwardly to an operative position of the crank relative to the shaft, and downwardly to a stored position of the crank relative to the shaft. As described earlier, with the hand crank in its operative position relative to the shaft 14, rotating the shaft in opposite directions causes the gear mechanisms of the landing assembly columns 10 to respectively lower the landing gear legs 12 relative to the columns, or raise the landing gear legs relative to the columns.

FIG. 2 shows the speed crank locking device of the present invention coupling a hand crank 22 to an input shaft 24 of a mechanism, for example the input shaft 16 of FIG. 1. The hand crank 22 is provided with the speed crank locking device of the invention that securely attaches the hand crank to the input shaft 24 in the operative position of the crank, and is quickly and easily unlocked from the input shaft enabling the hand crank to be pivoted to its stored position. The speed crank locking device could be provided as a part of a manufactured landing gear assembly, or could be retrofit to an existing landing gear assembly.

The hand crank 22 of the invention is similar to prior art crank constructions. The crank 22 is basically a hollow tube having a length that has been formed in a general S-shape with opposite proximal 26 and distal 28 ends. A handle sleeve 30 is mounted on the crank distal end 28 for rotation of the sleeve on the crank end. The opposite proximal end 26 of the crank is formed with an internal socket 32. Indents are formed in the hand crank adjacent the crank proximal end. The indents form projecting abutments 34 inside the hand crank at the back of the socket.

Figure 4:
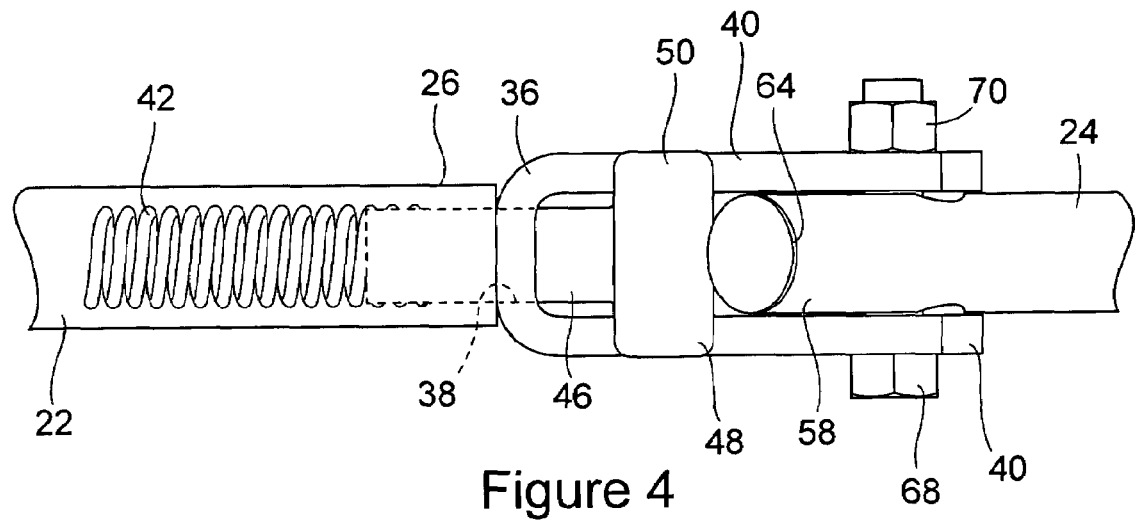
FIG. 4 is a plan view of the crank and shaft locking device shown in FIG. 3.
Figure 5:
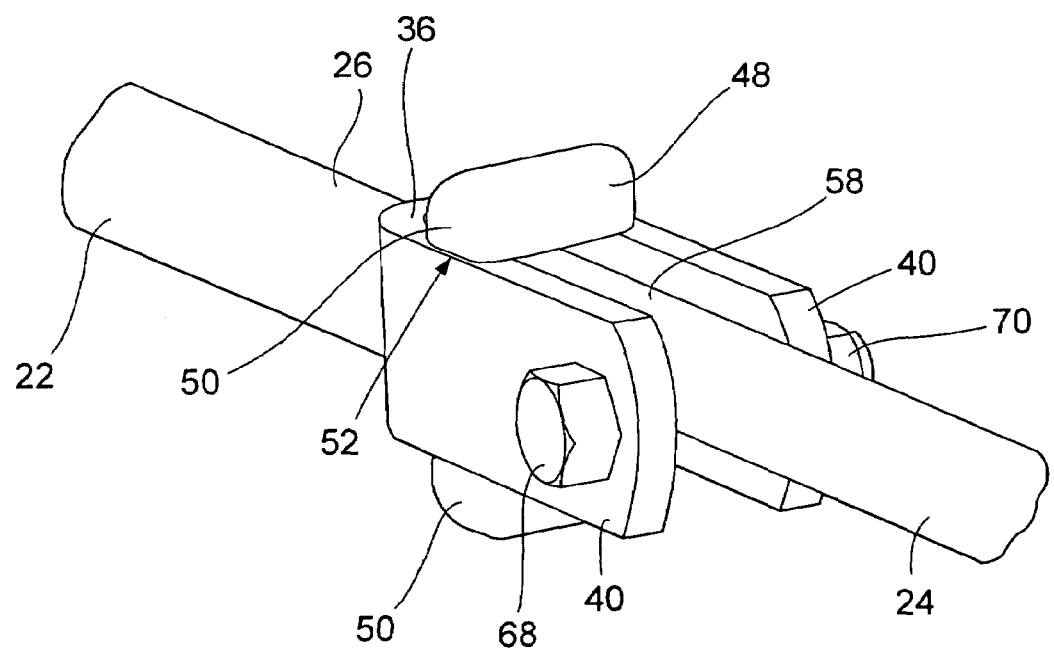
FIG. 5 is a perspective view of the crank and shaft end in their locked relative positions.
Figure 6:
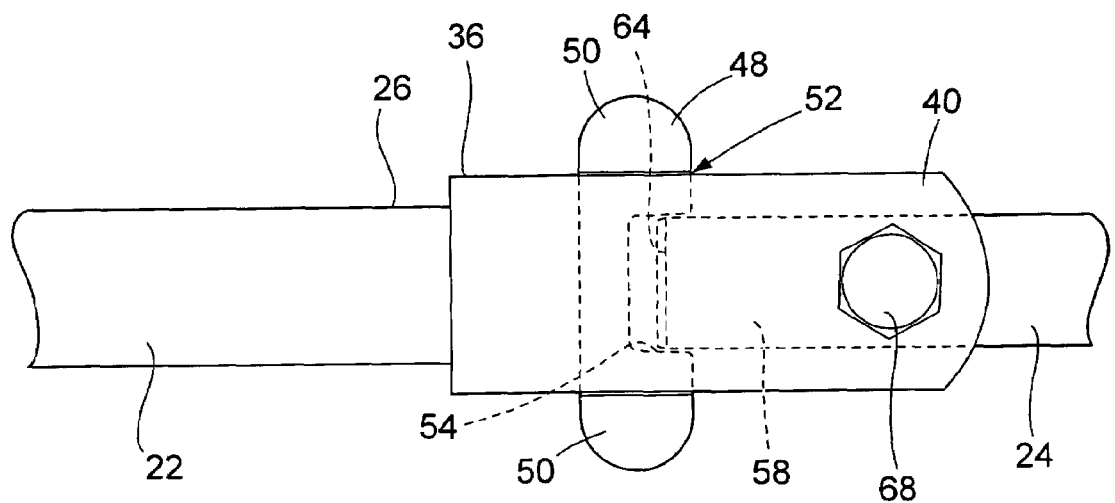
FIG. 6 is a side view of the crank and shaft end in their locked relative positions; and, FIG. 7 is a plan view of the crank and shaft end shown in FIG. 6.
Figure 7:
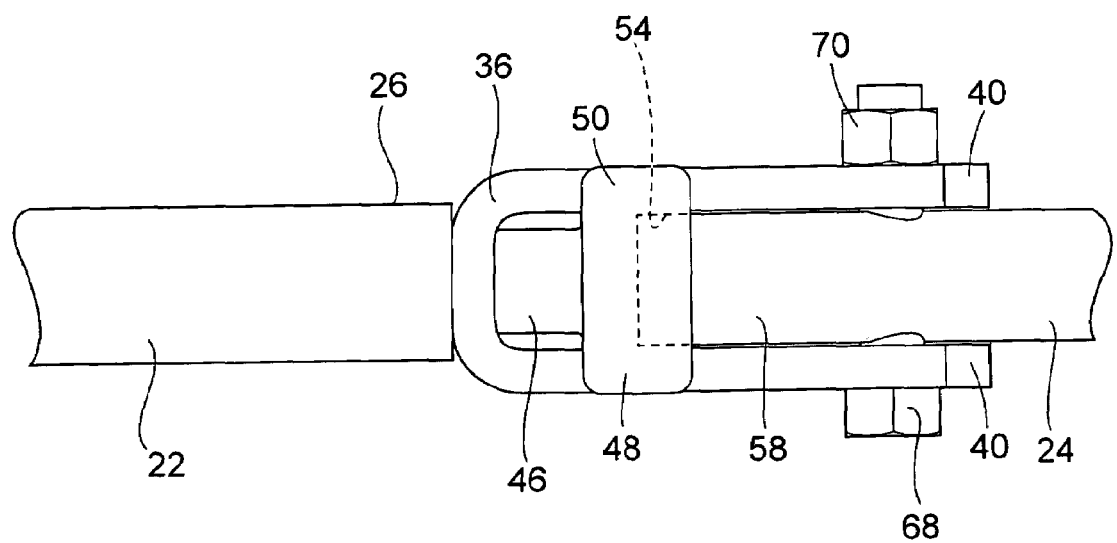

A U-shape yoke 36 is secured to the crank proximal end 26. The yoke 36 has a base secured to the crank proximal end 26 by welds or other equivalent means. A hole 38 passes through the yoke base and is dimensioned to be continuous with the interior diameter dimension of the crank socket 32. The yoke has a pair of arms or flanges 40 that project outwardly away from the yoke base and away from the crank proximal end 26. As seen in FIG. 4, each of the yoke arms 40 has a spacing between the arms that is slightly larger than the diameter of the yoke base hole 38 and the interior diameter of the crank socket 32. As an alternative, the crank 22 could be formed with a pair of integral arms 40 that project outwardly from opposite sides of the crank socket 32.

Circular pin holes 41 are formed through each of the crank yoke arms 40. The crank pin holes 41 are aligned with each other.

A coil spring 42 is received inside the hand crank socket 32. As seen in FIG. 3, the spring 42 has an outside diameter that is slightly smaller than the inside diameter of the socket 32. This allows the spring to freely compress and extend inside the socket. The spring 42 is inserted into the bottom of the socket 32 and engages against the socket abutments 34 at one end.

A plunger 44 is mounted in the hand crank socket 32 for reciprocating movements of the plunger relative to the hand crank 22. The plunger 44 has a cylindrical rod 46 that is received in sliding engagement in the hand crank socket 32. An end of the plunger rod 46 engages against the coil spring 42 in the socket 32. The length of the plunger rod 46 extends from the spring 42 outside of the crank arm socket 32. A head 48 is formed on the end of the plunger rod 46 that is opposite the coil spring 42. The plunger head 48 has a width that is slightly smaller than the spacing between the crank arms 40, allowing the head to freely reciprocate between the arms. The head 48 has a length dimension that positions opposite ends 50 of the head outside the spacing between the crank arms 40. The opposite ends 50 of the plunger head 48 extend across the side edges of the crank arms 40, thereby forming wide slots 52 in the opposite sides of the plunger head 48 that receive the crank arms 40. The slots 52 positively position the plunger head 48 between the crank arms 40 while allowing the crank arms 40 to slide through the head slots 52 as the plunger head 48 reciprocates relative to the hand crank proximal end 26. As seen in FIG. 3, the opposite plunger head ends 50 are formed with rounded sliding surfaces that enable the input shaft end to easily slide over the surfaces in a manner to be explained. A flat end surface of the plunger head 48 is provided with a hole 54 that is recessed into the plunger head. The hole 54 is dimensioned to receive the end of the input shaft 24 in a manner to be explained.

The input shaft 24 is constructed in basically the same manner as the prior art input shaft. The shaft 24 has a length with a center axis of rotation 56 and opposite proximal 58 and distal ends. A pair of pin holes 62 extend transversely through the shaft adjacent the opposite shaft ends 58, 60. The hand crank 22 of the invention will be described as being connected to the shaft proximal end 58. However, the hand crank 22 could be connected to the opposite shaft distal end 60 if so desired. The shaft proximal end 58 is provided with a tapered surface 64 that assists in inserting the shaft end into the plunger head hole 54.

A shaft pin 66 extends through the pin hole 62 at the shaft proximal end 58. As seen in FIG. 4, the pin 66 is a bolt having a bolt head 68 at one end of the pin and a locking nut 70 screw threaded on the opposite end of the pin. Other equivalent types of pins having heads formed at their opposite ends could also be used. The pin has a length between the bolt head 68 and the locking nut 70 that enables the pin to be tightened against the crank yoke arms 40 to prevent wobbling of the hand crank 22 relative to the shaft 24. The pin 66 extends through the crank arm holes 41 and connects the hand crank 22 to the input shaft 24 for pivoting movement of the crank between operative and stored positions in the same manner as prior art hand crank and landing gear assemblies.

In the stored position of the hand crank 22 beneath to the input shaft 24, the coil spring 42 pushes the plunger head 48 into engagement with the side of the input shaft. This holds the hand crank 22 in the stored position. As the hand crank is moved from its stored position beneath the input shaft toward its operative position relative to the input shaft, the plunger spring 42 continues to push the plunger head 48 into engagement with the shaft. The shaft end 58 slides across the plunger head surface 50 as the hand crank is pivoted upwardly relative to the input shaft. As the hand crank approaches its operative position with the crank arm socket 32 aligned with the shaft end 58, the shaft end approaches the hole 54 in the plunger head surface. When the shaft end 58 is aligned with the plunger head hole 54, the plunger spring 42 pushes the plunger head toward the shaft end causing the shaft end 58 to move into the plunger hole 54. This positively engages the crank arm 22 to the landing gear assembly input shaft 24 for rotation of the shaft on rotation of the crank arm. The coil spring 42 biasing the plunger 44 into engagement with the shaft end 58 prevents the shaft end from becoming inadvertently disengaged from the crank arm as the crank arm is rotated. The pivot pin 66 connection between the shaft end 58 and the crank arm holes 41 maintains the connection between the shaft and crank arm as the shaft is shifted axially by pulling on the crank arm. The coil spring 42 pushing the plunger 44 into engagement with the shaft end 58 also provides a secure connection between the crank arm and the shaft, eliminating the wobbling feeling of the prior art hand crank and landing gear assembly shaft connection.

To disengage the hand crank 22 from the landing gear input shaft 24 to move the hand crank to its stored position, the truck driver merely grasps the lock plunger head 48 with one hand and pulls the plunger head toward the crank arm socket 32. This causes the plunger rod 46 to compress the spring 42 in the crank arm socket, and disengages the shaft end 58 from the plunger head hole 54. The crank arm is then free to pivot about the pivot pin to its stored position beneath the landing gear assembly input shaft.

The preferred embodiment of the speed crank locking device positions the coil spring inside the socket of the crank arm where the spring is protected from the exterior environment. In an alternate embodiment of the device, the spring is positioned on the plunger rod outside the crank arm socket. The spring functions in the same manner, biasing the lock plunger head toward the input shaft end.

Both embodiments of the hand crank locking device of the invention require only minimal modifications to the component parts used in a conventional pivoting connection between a hand crank and a landing gear assembly input shaft. Both embodiments provide the benefits of a hand crank that is easily locked to the input shaft in its operative position, and is easily unlocked from the input shaft, without appreciably increasing the cost of manufacturing the hand crank and its connecting assembly to the input shaft.

Although the speed crank locking device of the invention has been described above by referring to several embodiments of the invention, it should be understood that modifications and variations could be made to the device without departing from the intended scope of the following claims.

The invention claimed is:

1. A manual drive apparatus providing input rotation to a mechanism, the apparatus comprising:
    an input shaft having an axis of rotation and a shaft end;
    a crank connected to the shaft end for movement of the crank between a stored position where the crank is beside the shaft, and an operative position where an end of the crank is axially aligned with an end of the shaft;
    a lock member mounted on the crank for movement of the lock member between locked and unlock positions of the lock member relative to the shaft, where the lock member engages over the end of the shaft when the lock member is in the locked position, and the lock member being positioned adjacent a side of the shaft when the lock member is in the unlocked position; and,
    the lock member being mounted on the crank for movement of the lock member relative to the crank.

2. The apparatus of claim 1, further comprising:
    the lock member having an end surface with a hole, and the shaft end being positioned inside the hole when the crank is in the operative position relative to the shaft, and the shaft end being positioned outside the hole when the crank is in the stored position relative to the shaft.

3. The apparatus of claim 2, further comprising:
    a pin extending through the shaft and through the crank connecting the crank to the shaft for pivoting movement between the stored and operative positions.

4. The apparatus of claim 1, further comprising:
    the lock member having an end surface with a recess, and the shaft end being positioned inside the recess when the crank is in the operative position.

5. The apparatus of claim 4, further comprising:
    the shaft end being outside of the recess when the crank is in the stored position.

6. The apparatus of claim 1, further comprising:
    a pin extending through the shaft and through the crank mounting the crank to the shaft for pivoting movement of the crank between the stored and operative positions relative to the shaft; and,
    the lock member moving from the unlocked to the locked position in response to moving the crank from the stored to the operative position.

7. The apparatus of claim 6, further comprising:
    a spring on the crank operatively urging the lock member toward the shaft.

8. The apparatus of claim 7, further comprising:
    the spring on the crank being positioned inside the crank.

9. The apparatus of claim 7, further comprising:
    the spring on the crank pushing the lock member into engagement with the shaft as the crank is pivoted between the stored and operative positions.

10. A manual drive apparatus providing input rotation to a mechanism, the apparatus comprising:
    an input shaft having an axis of rotation and a shaft end;
    a crank connected to the shaft end for movement of the crank between a stored position where the crank is beside the shaft, and an operative position where an end of the crank is axially aligned with an end of the shaft;
    a lock member mounted on the crank for movement of the lock member between locked and unlock positions of the lock member relative to the shaft, where the lock member engages over the end of the shaft when the lock member is in the locked position, and the lock member being positioned adjacent a side of the shaft when the lock member is in the unlocked position;
    the lock member having an end surface with a hole, and the shaft end being positioned inside the hole when the crank is in the operative position relative to the shaft, and the shaft end being positioned outside the hole when the crank is in the stored position relative to the shaft;

a pin extending through the shaft and through the crank connecting the crank to the shaft for pivoting movement between the stored and operative positions; and, a spring on the crank pushing the lock member toward the shaft.

11. The apparatus of claim 10, further comprising:

the spring being positioned on the crank relative to the shaft to operatively push the lock member toward the shaft.

12. The apparatus of claim 10, further comprising:

the spring being positioned between the crank and the lock member to push the lock member toward the shaft.

13. The apparatus of claim 10, further comprising:

the spring pushing the lock member into engagement with the shaft as the crank is moved between the stored and operative positions.

14. The apparatus of claim 10, further comprising:

the lock member having a rod that is received in the socket for reciprocating movement in the socket; and, the spring being positioned inside the socket.

15. The apparatus of claim 10, further comprising:

the spring pushing the lock member against the side of the shaft when the crank is in the stored position and thereby holding the crank in the stored position.

16. A manual drive apparatus providing input rotation to a mechanism, the apparatus comprising:

an input shaft having an axis of rotation and a shaft end;

a crank connected to the shaft end for movement of the crank between a stored position where the crank is beside the shaft, and an operative position where an end of the crank is axially aligned with an end of the shaft;

a lock member mounted on the crank for movement of the lock member between locked and unlock positions of the lock member relative to the shaft, where the lock member engages over the end of the shaft when the lock member is in the locked position, and the lock member being positioned adjacent a side of the shaft when the lock member is in the unlocked position;

the crank having a socket; and, the lock member being mounted inside the socket for reciprocating movement in the socket.

17. A manual drive apparatus providing input rotation to a mechanism, the apparatus comprising:

an input shaft having axis of rotation and a shaft end;

a crank connected to the shaft end for movement of the crank between a stored position where the crank is beside the shaft, and an operative position where an end of the crank is axially aligned with an end of the shaft;

a lock member mounted on the crank for movement of the lock member between locked and unlock positions of the lock member relative to the shaft, where the lock member engages over the end of the shaft when the lock member is in the locked position, and the lock member being positioned adjacent a side of the shaft when the lock member is in the unlocked position; and, the lock member being mounted on the crank for linear reciprocating movement of the lock member.

18. A manual drive apparatus providing input rotation to a mechanism, the apparatus comprising:

an input shaft having an axis of rotation and a shaft end;

a crank connected to the shaft end for movement of the crank between a stored position where the crank is beside the shaft, and an operative position where an end of the crank is axially aligned with an end of the shaft;

a lock member mounted on the crank for movement of the lock member between locked and unlock positions of the lock member relative to the shaft, where the lock member engages over the end of the shaft when the lock member is in the locked position, and the lock member being positioned adjacent a side of the shaft when the lock member is in the unlocked position; and, the lock member engaging the side of the shaft and holding the crank in the stored position.

* * * * *